Sept. 24, 1946.  J. R. HEILMAN  2,407,984
TOASTER CASING STRUCTURE
Filed Sept. 11, 1944  2 Sheets-Sheet 1
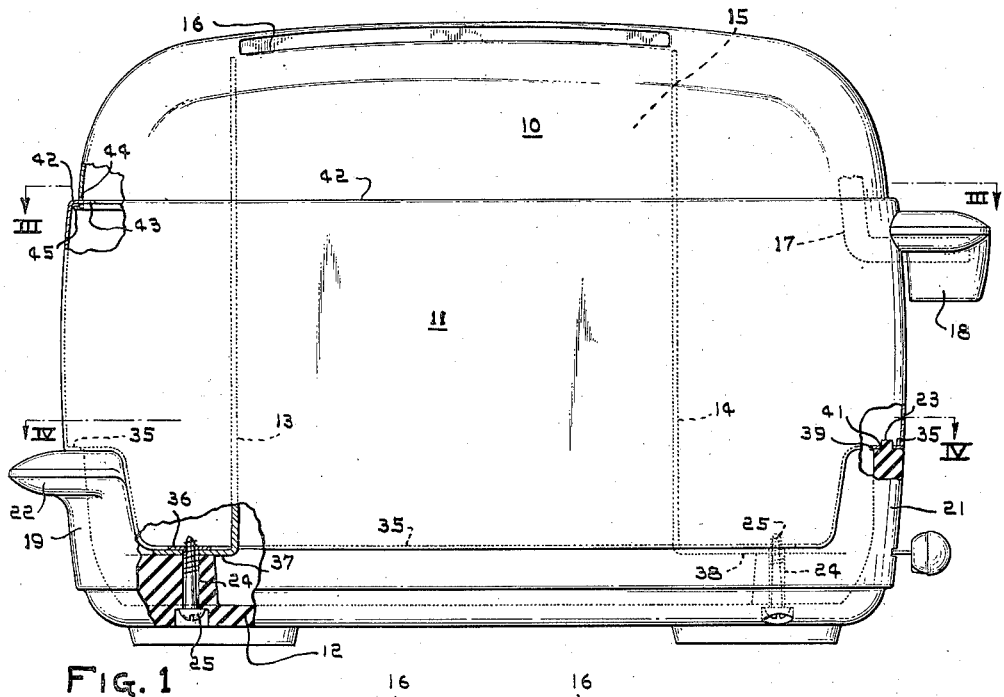
FIG. 1
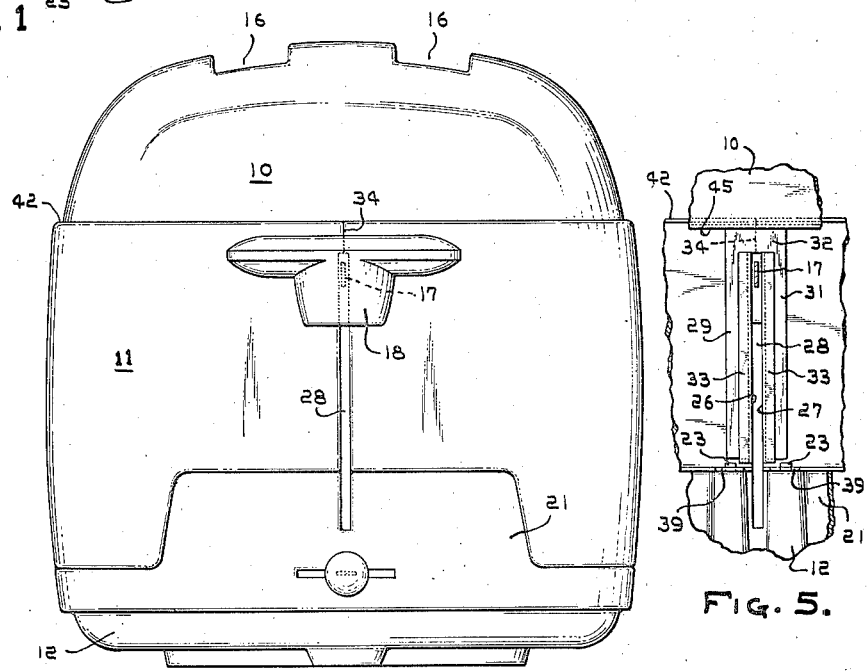
FIG. 2.
FIG. 5.
WITNESSES:
R. J. Ridge
E. H. Lutz.
INVENTOR
JOSEPH R. HEILMAN.
BY
ATTORNEY Sept. 24, 1946. J. R. HEILMAN 2,407,984
TOASTER CASING STRUCTURE
Filed Sept. 11, 1944 2 Sheets-Sheet 2

WITNESSES:

INVENTOR
JOSEPH R. HEILMAN.
BY
ATTORNEY

Patented Sept. 24, 1946

2,407,984

UNITED STATES PATENT OFFICE 2,407,984

TOASTER CASING STRUCTURE

Joseph R. Heilman, Mansfield, Ohio, assignor to Westinghouse Electric Corporation, East Pittsburgh, Pa., a corporation of Pennsylvania Application September 11, 1944, Serial No. 553,499

6 Claims. (Cl. 99—401)

1

My invention relates to toaster casing structures and has for its object to provide an improved casing structure of this kind.

A further object of the invention is to provide an improved casing structure for a toaster which may be readily and economically fabricated from a relatively small number of parts without welding or riveting operations.

These and other objects are effected by my invention as will be apparent from the following description and claims taken in connection with the accompanying drawings, forming a part of this application, in which:

Fig. 1 is a side view of my improved toaster casing structure with portions thereof broken away for the sake of clearness of illustration;

Fig. 2 is an elevation viewed from the right-hand end of Fig. 1;

Fig. 5 is a sectional view showing a detail and is taken along the line V—V of Fig. 4.

Figure 3:
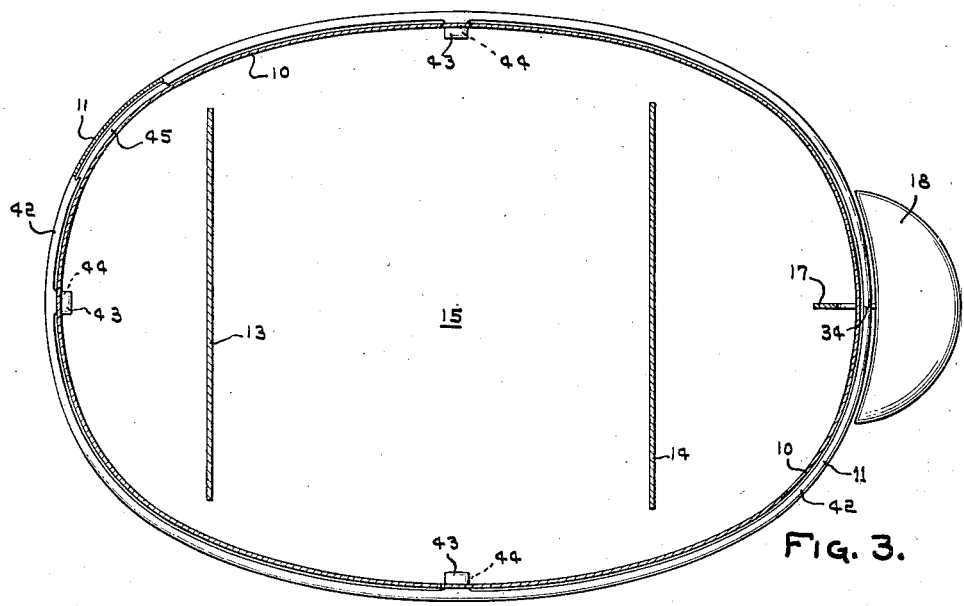
Fig. 3 is a sectional view showing apparatus in and adjacent the plane indicated by line III—III of Fig. 1.

Referring now to the drawings, I have shown my improved casing structure including a top wall or dome 10 carried by a side wall structure, generally shown at 11 and supported by a base 12 of any suitable material. The base 12 carries a pair of partitions 13 and 14 which define an intervening toasting chamber or oven 15, access openings to which are shown at 16 in the top wall 10. The toasting and movable bread supporting means are not shown for the sake of brevity and clearness and since they form no part of the present invention. It is to be understood that the usual heating elements are carried by and between the partitions 13 and 14 in any well understood manner, and that the bread carriage which carries the bread slices is movable upwardly and downwardly in the oven 15 by means of a handle shown in part at 17 and having a gripping portion 18 arranged exteriorly of the casing. A movable handle and bread carriage mechanism of the type referred to is disclosed in the copending application of Bernard F. Parr, Serial No. 495,815, filed July 23, 1943.

The base structure 12 which I have shown includes upwardly-extending portions 19 and 21 at opposite ends thereof, the portion 19 having a lifting handle formed thereon, as shown at 22. The opposite portion 21 of the base is provided with a pair of upwardly-extending projections 23 for positioning the side wall 11 properly on

2 the base 12 during the assembly of the side wall to the base, as described hereinafter. The base 12 is also provided with a plurality of openings 24, four in number, for the reception of self-tapping screws 25 which are employed for fastening the side wall 11 and the partitions 13 and 14 to the base 12.

Figure 4:
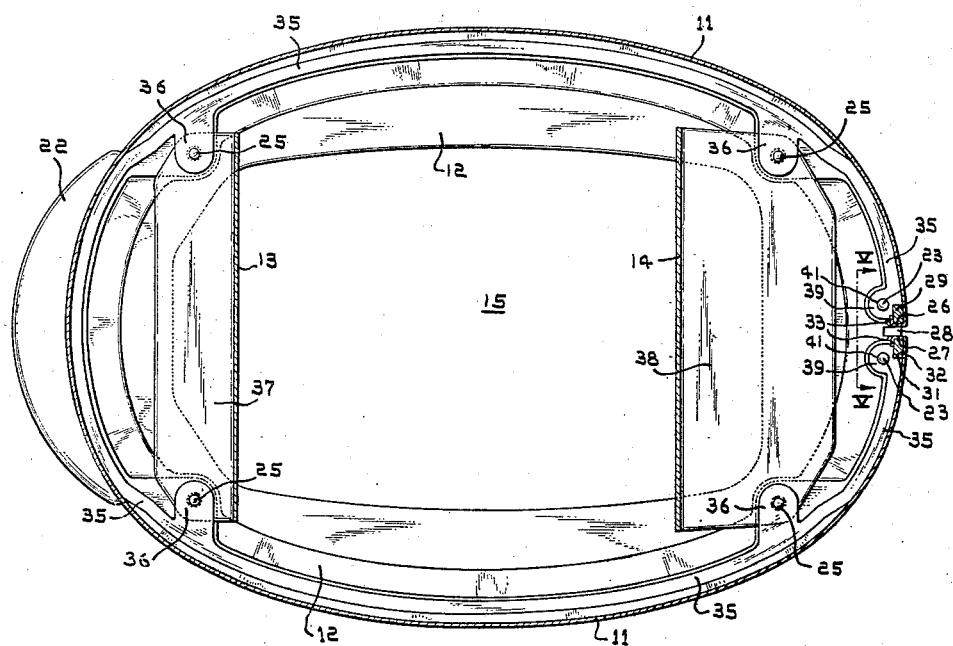
Fig. 4 is a sectional view taken along the line IV—IV of Fig. 1.

The side wall 11 is preferably formed from a single piece of material and may be elliptical in configuration, as best shown in Fig. 4. The meeting margins of the side wall are brought together adjacent one end of the toaster and are provided with inturned flanges 26 and 27 which are spaced apart to define a slot 28 in which the handle 17 operates. The flanges 26 and 27 are engaged by fixed legs 29 and 31 of a hairpin key piece or keeper 32 which maintains the meeting ends of the side wall 11 in proper position and prevents separation of the meeting ends. The keeper 32 is retained in position by overturned portions 33 of the inward ends of the flanges 26 and 27 (see Figs. 4 and 5). A small portion of the upper ends of the meeting margins of the side wall is engaged, as shown at 34 in Fig. 5.

The lower edge of the side wall structure 11 may be provided with a relatively small inturned flange 35 which engages the upper surface of the base 12, and this flange 35 is provided with inwardly-extending ears 36 into which the self-tapping screws 25 are threaded during the assembly of the side wall to the base. In this connection, it will be noted in Fig. 1 that the partitions 13 and 14 include horizontally-extending supporting portions 37 and 38 which are disposed beneath the ears 36 and which have suitable openings through which the self-tapping screws project. The inturned flange 35 of the side wall 11 is also provided with a pair of ears 39 having respective openings 41 formed therein for receiving the projections 23 formed on the base structure. These ears 39 position the side wall 11 on the base during its assembly to the base and also assist in preventing separation or inward movement of the marginal ends of the casing 11 when assembled to the base 12.

The top edge of the side wall 11 is provided with a relatively small inturned flange 42 having a plurality of inwardly-extending tongues 43 formed thereon, as best shown in Figs. 1 and 3. The tongues 43 are disposed in respective apertures 44 formed in the sides of the domed top wall 10 adjacent the periphery thereof. A relatively small outwardly-extending flange 45 may be formed along the lower edge of the top wall 10 and is arranged beneath the flange 42 of the side wall 11. It will be noted that the top wall 10 is supported by the three tongues 43 and also by the top of the keeper 32 which engages the underside of the flange 45, as shown in Fig. 5.

The assembly of the base, the partitions 13 and 14, and the casing will now be described. It will be understood that the top wall 10 and the side wall 11 are formed, as shown in the drawings, after which they may be finished, for example, with a plating of chromium or the like. In assembling the top 10 to the side wall 11, the latter is sprung outwardly slightly from its position shown in Fig. 3 in order that the tongues 43 may be disposed in the apertures 44 in the top wall 10. The sides of the side wall 11 are then moved inwardly to the position shown in the drawings and the keeper 32 is slid over the inturned flanges 26 and 27, after which the inner ends of the flanges are bent over the keeper, as shown at 33, to retain the keeper in engagement with the flanges 26 and 27. As set forth heretofore, the upper edge of the keeper 32 defines a support upon which the right-hand end of the top wall 10 rests, as shown in Fig. 5. This is all that is necessary in the assembly of the top wall and the side wall.

In assembling the casing structure to the base, the partitions 13 and 14 supporting the toaster structure (not shown) are set upon the base with the openings in the horizontal portions 37 and 38 of the partitions 13 and 14 approximately in alignment with the openings 24 in the base. The assembled casing structure is then lowered over the partitions 13 and 14 with the slot 28 receiving the handle 17. The openings 41 in the ears 39 encompass the projections 23 so that the holes in the ears 36 will be substantially in alignment with the openings 24 in the base. In the specific form of base and side wall structure which I have shown, the upwardly-extending portions 19 and 21 of the base will also assist in supporting the side wall 11 on the base 12, as it will be noted that the side wall 11 is recessed to receive the upwardly-extending base portions 19 and 21. After the operations which I have described have been completed, the four self-tapping screws 25 are inserted in the openings 24 in the base and are threaded into the ears 36 of the side wall 11. The assembly of the casing structure, the toaster mechanism supporting partitions 13 and 14 and the base 12 is now complete.

It will be apparent from the foregoing description that I have provided an improved casing structure for a toaster having a top wall and a side wall structure which may be formed and finished completely and then assembled together without riveting or welding operations and without marring the highly finished surfaces of these parts. The keeper 32 may be formed of inexpensive sheet material, as it is hidden from view and is securely held in position by turning over the inner margins 33 of the flanges 26 and 27. Any scarring of the flanges 26 and 27 during this operation is of no importance as they are not in view when the assembly is complete. The top wall 10 is positioned properly on the side wall 11 by the tongues 43 which fit within the apertures 44 in the top wall and by the top edge of the keeper 32 which is in engagement with the top wall. While I have shown self-tapping screws securing the completed casing to the base, it will be understood that other means may be employed. The casing structure which I have disclosed is more readily and economically fabricated than prior structures of which I am aware.

While I have shown my invention in but one form, it will be obvious to those skilled in the art that it is not so limited, but is susceptible of various changes and modifications without departing from the spirit thereof.

What I claim is:

1. In a casing structure for an electric toaster mechanism including a handle movable upwardly and downwardly between toasting and non-toasting positions, the combination of a base for supporting the toaster mechanism, a top wall spaced above the base and having an opening therein for the passage of bread to and from the toaster mechanism, a side wall structure carried by the base and engaging said top wall, said side wall structure encompassing the toaster mechanism and formed as a unit with its opposed ends disposed adjacent each other, said opposed ends of the side wall structure having respective clamping members formed thereon and extending inwardly of the casing structure and at least a portion of the opposed ends of the side wall structure being spaced to define a slot through which said handle projects, a keeper having spaced-apart legs engaging said clamping members and preventing separation of the casing ends and means for retaining the keeper in engagement with the clamping members.

2. In a casing structure for an electric toaster mechanism having an actuating handle movable upwardly to a non-toasting position and downwardly to a toasting position, the combination of a base, a top wall spaced above the base and having openings therein for the passage of bread to and from the toaster mechanism, a side wall structure carried by the base and supporting said top wall, said side wall structure encompassing the toaster mechanism and being formed as a unit, said side wall structure having its opposed ends disposed adjacent each other but spaced apart to define a vertical slot for said actuating handle, respective clamping members extending inwardly of the casing structure from said ends, a keeper having spaced-apart legs positioning said clamping members and preventing separation of the casings ends and means for retaining the keeper in engagement with the clamping members.

3. In a casing structure for an electric toaster mechanism having an operating handle extending therefrom and movable upwardly and downwardly between toasting and non-toasting positions, the combination of a base supporting the toaster mechanism, a top wall spaced above the base and having an opening therein for the passage of bread to and from the toaster mechanism, a side wall structure carried by the base and supporting the top wall, said side wall structure extending generally peripherally of the base and having its vertical end margins opposed and provided at least in part with respective, inwardly-extending flanges, said flanges being spaced to define a slot through which said handle extends, a keeper having fixed spaced-apart legs engaging said flanges and preventing separation thereof and means for retaining the keeper in engagement with the flanges.

4. In a casing structure for an electric toaster mechanism having an operating handle extending therefrom and movable upwardly and downwardly between toasting and non-toasting positions, the combination of a base, a domed top wall spaced above the base and including an opening for the passage of bread to and from the toaster mechanism, said top wall having a plurality of apertures spaced around the periphery thereof, a side wall structure encompassing said toaster mechanism and carried by the base, a plurality of tongues formed on the side wall structure and extending within the respective apertures of the top wall for supporting the top wall, said side wall structure having generally vertical end margins arranged adjacent but spaced apart for defining a slot for receiving said handle, said end margins including respective flanges extending inwardly of the casing and a keeper having fixed leg portions engaging said flanges for preventing separation thereof, and means for retaining the keeper in engagement with the flanges.

5. In a casing structure for an electric toaster mechanism having an operating handle extending therefrom and movable upwardly and downwardly between toasting and non-toasting positions, the combination of a base supporting the toaster mechanism, a domed top wall spaced above the base and having an opening therein for the passage of bread to and from the toaster mechanism, said top wall having a plurality of apertures formed therein and spaced about the periphery thereof, a one-piece side wall encompassing the toaster mechanism and extending between the base and the top wall, a plurality of tongues carried by the side wall and extending respectively within said apertures for the support of the top wall, said side wall having meeting end margins provided at least in part with respective inwardly-extending flanges spaced apart for defining a slot for the reception of said handle, and a keeper having fixed legs spaced apart and arranged in contact with said flanges for preventing separation thereof, said flanges having end portions normal to the flanges for retaining the keeper in position.

6. In a casing structure for an electric toaster mechanism having an operating handle extending therefrom and movable upwardly and downwardly between toasting and non-toasting positions, the combination of a base supporting the toaster mechanism, a domed top wall spaced above the base and having an opening therein for the passage of bread to and from the toaster mechanism, said top wall having a plurality of apertures formed therein and spaced about the periphery thereof, a one-piece side wall encompassing the toaster mechanism and extending between the base and the top wall, a plurality of tongues extending horizontally inwardly from the side wall and carried thereby, said tongues being disposed within the apertures, respectively, for the support of the top wall, said side wall having meeting end margins provided at least in part with respective inwardly-extending flanges spaced apart for defining a slot for the reception of said handle, and a U-shaped keeper having its spaced legs engaging said flanges for preventing separation of the end margins of the casing, said flanges having their inner ends bent normal to the flanges for retaining said keeper in engagement with the flanges.

JOSEPH R. HEILMAN.